W. H. LUCAS.
METAL CUTTING SAW.
APPLICATION FILED SEPT. 16, 1908.
938,158.
Patented Oct. 26, 1909.
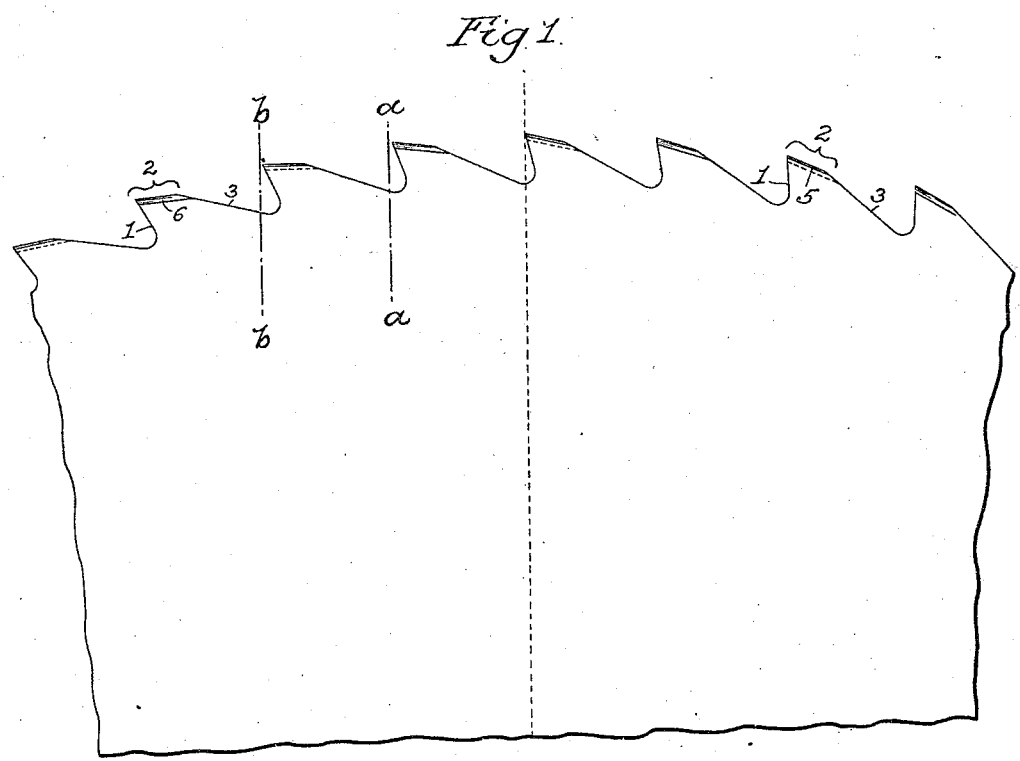
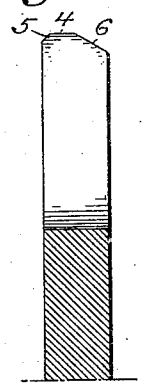
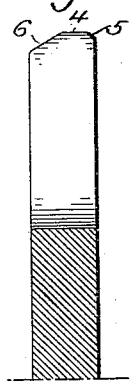
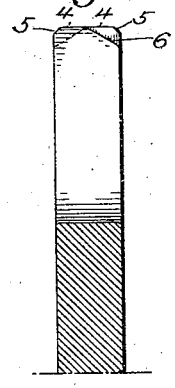
Witnesses
Hamilton D. Turner
Harry L. Smith
Inventor
William H. Lucas
by his attorneys

UNITED STATES PATENT OFFICE.

WILLIAM H. LUCAS, OF PHILADELPHIA, PENNSYLVANIA, ASSIGNOR TO FRED F. ESPEN, JACOB ESPEN, JR., AND WILLIAM H. LUCAS, ALL OF PHILADELPHIA, PENNSYLVANIA.

METAL-CUTTING SAW.

938,158.  Specification of Letters Patent.  Patented Oct. 26, 1909.

Application filed September 16, 1908. Serial No. 453,321.

*To all whom it may concern:*

Be it known that I, WILLIAM H. LUCAS, a citizen of the United States, residing in Philadelphia, Pennsylvania, have invented certain Improvements in Metal-Cutting Saws, of which the following is a specification.

My invention relates to that class of metal cutting saws which have successive teeth of different contour, whereby each tooth makes but a portion of the full cut, the object of my invention being to so construct such a saw that the teeth of the same will be subjected to substantially uniform strain, can be quickly and accurately sharpened by grinding when they become dull, and will remove the metal in the form of short curled shavings which will have no tendency to clog the teeth.

In the accompanying drawing Figure 1 is a side view of part of a circular metal cutting saw with teeth in accordance with my invention; Fig. 2 is an enlarged section on the line $a$—$a$, Fig. 1; Fig. 3 is an enlarged section on the line $b$—$b$, Fig. 1, and Fig. 4 is an enlarged sectional view showing the relation to each other of the successive teeth of the saw.

Each tooth of the saw is without lateral bend or set, and has a front face 1, a peripheral or cutting face 2, and a rear face 3, the front face of the tooth being inclined rearwardly at an angle of about fifteen degrees from a radial line, the peripheral or cutting face 2 having the angle necessary for clearance and the rear face 3 being on an angle dependent upon the distance apart of the teeth of the saw.

Each of the peripheral portions 2 of each tooth has a substantially flat cutting face 4, slightly beveled at the outer corner, as shown at 5, and a beveled or non-cutting face 6, the cutting faces of alternate teeth being reversely arranged, as shown in Fig. 4, and each of such cutting faces extending from one outer face of the saw blade to or beyond the middle of the blade, whereby each tooth makes one-half of the full cut, the work being thereby distributed so as to facilitate the cutting operation and provide for rapid action of the saw without undue strain upon the teeth of the same.

Because of the laterally contracted cutting face presented by each tooth of the saw in connection with the undercut front face of the tooth the cuttings made by each tooth are in the form of thin and narrow curled shavings which readily free themselves from the throat of the tooth and prevent any clogging of the same, and by reason of the fact that the beveled sides of the peripheral portions of the teeth are disposed alternately right and left the sharpening of the teeth by grinding is readily accomplished by means of a swinging emery wheel acting first on one side of the saw and then on the opposite side of the same, the saw being moved forwardly to the extent of one tooth between successive actions.

The beveling of the outer corner of the cutting face of each tooth prevents the formation of a sharp point on said cutting face and this portion of the tooth cannot therefore break down under strain, and impair the cutting action as it would if such a sharp point was presented. The beveled or non-cutting face of each tooth is of the same width from front to rear in order to avoid the production of a wedge-shaped pocket located adjacent to the cutting face of the tooth and thereby lessen the tendency of the tooth to be clogged or jammed during the cutting operation.

I claim:—

1. A metal cutting saw having, on the peripheral portion of each tooth, a substantially flat cutting face and a beveled or non-cutting face, the flat face being of substantially one-half the width of the tooth and the beveled face being of the same width from front to rear, the bevel of one tooth being on the right hand side and of the next tooth on the left hand side throughout the series of teeth.

2. A metal cutting saw having teeth with peripheral portions each presenting a substantially flat cutting face with slightly beveled outer corner, and a beveled or non-cutting face, the flat face being of substantially one-half the width of the tooth and the flat faces of the teeth being reversely disposed in successive teeth.

3. A metal cutting saw having teeth, each with an undercut front face and a peripheral portion presenting a substantially flat cutting face with slightly beveled outer corner, and a beveled or non-cutting face, the flat face being of substantially one-half the width of the tooth and the flat faces of the teeth being reversely disposed in successive teeth.

In testimony whereof, I have signed my name to this specification, in the presence of two subscribing witnesses.

WM. H. LUCAS.

Witnesses:
 HAMILTON D. TURNER,
 KATE A. BEADLE.